United States Patent
Kim et al.

(10) Patent No.: US 8,730,206 B2
(45) Date of Patent: May 20, 2014

(54) DISPLAY DEVICE INCLUDING A TOUCH SENSOR

(75) Inventors: Chul Kim, Hwaseong-si (KR); Su-Bin Park, Incheon (KR); Seung Hwan Moon, Asan-si (KR); Byoung Jun Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 239 days.

(21) Appl. No.: 13/312,144

(22) Filed: Dec. 6, 2011

(65) Prior Publication Data

US 2013/0038569 A1    Feb. 14, 2013

(30) Foreign Application Priority Data

Aug. 9, 2011    (KR) .......................... 10-2011-0079211

(51) Int. Cl.
*G06F 3/044*    (2006.01)
*G06F 3/045*    (2006.01)

(52) U.S. Cl.
USPC ...................... 345/174; 178/18.05; 178/18.06

(58) Field of Classification Search
USPC ............................ 345/87–103, 104, 156–178
See application file for complete search history.

(56) References Cited

U.S. PATENT DOCUMENTS

| | | | |
|---|---|---|---|
| 2009/0079707 A1* | 3/2009 | Kaehler et al. | 345/174 |
| 2009/0096765 A1 | 4/2009 | Kuo et al. | |
| 2009/0174681 A1 | 7/2009 | Chang et al. | |
| 2009/0273572 A1 | 11/2009 | Edwards et al. | |
| 2010/0014014 A1* | 1/2010 | Kim | 349/42 |
| 2010/0073322 A1 | 3/2010 | Jiang et al. | |
| 2011/0157043 A1* | 6/2011 | Lai et al. | 345/173 |
| 2011/0175846 A1* | 7/2011 | Wang et al. | 345/174 |

FOREIGN PATENT DOCUMENTS

| | | |
|---|---|---|
| JP | 2009042899 | 2/2009 |
| JP | 2010039380 | 2/2010 |
| KR | 1020090015482 | 2/2009 |
| KR | 1020090059726 | 6/2009 |
| KR | 101009672 | 1/2011 |

* cited by examiner

*Primary Examiner* — Seokyun Moon
*Assistant Examiner* — Peijie Shen
(74) *Attorney, Agent, or Firm* — Cantor Colburn LLP

(57) ABSTRACT

A display device includes: a first insulation substrate having an upper surface and a lower surface; a transparent conductive layer disposed on the upper surface of the first insulation substrate; a gate line disposed on the lower surface of the first insulation substrate; a gate insulating layer disposed on the gate line; a semiconductor layer disposed on the gate insulating layer; a data line disposed on the semiconductor layer and connected to a source electrode and a drain electrode facing the source electrode; and a pixel electrode electrically connected to the drain electrode, where the gate line, the gate insulating layer, the semiconductor layer and the data line are sequentially disposed on the lower surface of the first insulation substrate.

19 Claims, 8 Drawing Sheets

DISPLAY DEVICE INCLUDING A TOUCH SENSOR

This application claims priority to Korean Patent Application No. 10-2011-0079211, filed on Aug. 9, 2011, and all the benefits accruing therefrom under 35 U.S.C. §119, the content of which in its entirety is herein incorporated by reference.

BACKGROUND OF THE INVENTION (a) Field of the Invention

Exemplary embodiments of the invention relate to a display device including a touch sensor.

(b) Description of the Related Art

A liquid crystal display "(LCD)" is one of the most widely used types of flat panel display. The LCD typically includes two display panels in which field-generating electrodes, such as a pixel electrode and a common electrode, for example, are provided, and a liquid crystal ("LC") layer disposed between the field-generating electrodes. The LCD displays images by applying voltages to the field-generating electrodes to generate an electric field in the LC layer that determines the orientations of LC molecules therein to adjust polarization of incident light.

The LCD may operate with various input devices. More particularly, the LCD including a touch panel as the input device thereof has been used.

The touch panel device is a device that allows a machine, such as a computer, for example, to perform a command by touching a screen of a touch panel with a finger or a touch pen (or stylus) to write or draw characters or execute icons. A display device attached with the touch panel thereto or including the touch panel therein determines whether or not a user's finger or a touch pen touches the screen, and information on a touch position to thereby input a command.

The touch panel is typically divided into a resistive type, a capacitive type, an electro-magnetic type ("EM"), and an optical type in accordance with a touch detection method.

The capacitance type of touch panel includes a film formed with a transparent electrode, and touch existence, and touch positions may be determined by measuring a voltage change by a contact with a finger or a conductive material while a voltage is applied to the transparent electrode.

The touch panel of the capacitance type typically includes two transparent conductive layers for sensing on the display panel and an insulating layer therebetween, or an additional metal layer for sensing inside the display panel and the insulating layer must be formed, such that the manufacturing process is complicated.

BRIEF SUMMARY OF THE INVENTION

Exemplary embodiments of the invention provide a display device including a touch panel having a simple structure.

In an exemplary embodiment, a display device includes: a first insulation substrate having an upper surface and a lower surface; a transparent conductive layer disposed on the upper surface of the first insulation substrate; a gate line disposed on the lower surface of the first insulation substrate; a gate insulating layer disposed on the gate line; a semiconductor layer disposed on the gate insulating layer; a data line disposed on the semiconductor layer and connected to a source electrode and a drain electrode facing the source electrode; and a pixel electrode electrically connected to the drain electrode, where the gate line, the gate insulating layer, the semiconductor layer and the data line are sequentially disposed on the lower surface of the first insulation substrate.

In an exemplary embodiment, a capacitance may be generated between the transparent conductive layer and the gate line such that a touch sensor is collectively defined by the transparent conductive layer and the gate line.

In an exemplary embodiment, the transparent conductive layer may extend in a direction crossing the gate line.

In an exemplary embodiment, the gate line may extend in a transverse direction and include, a gate electrode protruded from the gate line, and the transparent conductive layer may overlap the gate electrode.

In an exemplary embodiment, the transparent conductive layer may include a first region and a second region, the first region of the transparent conductive layer overlaps the gate electrode, and the second region of the transparent conductive layer is adjacent to the gate electrode and not overlapping the gate electrode.

In an exemplary embodiment, a width of the first region may be less than a width of the second region.

In an exemplary embodiment, the transparent conductive layer may surround at least a portion of the gate electrode in a top view.

In an exemplary embodiment, the display device may further include a common electrode disposed in a layer, in which the gate line is disposed, and the common electrode and the transparent conductive layer are overlapping each other.

In an exemplary embodiment, the display device may further include a polarizer disposed on the transparent conductive layer.

In an exemplary embodiment, the display device may further include a second insulation substrate disposed opposite to the first insulation substrate, and a liquid crystal layer disposed between the first insulation substrate and the second insulation substrate.

In an exemplary embodiment, a display device includes: a first insulation substrate having an upper surface and a lower surface; a plurality of transparent conductive layers disposed on the upper surface of the first insulation substrate; a plurality of gate lines disposed on the lower surface of the first insulation substrate; a gate insulating layer disposed on the plurality of gate lines; a semiconductor layer disposed on the gate insulating layer; and a plurality of data lines disposed on the semiconductor layer, where the gate insulating layer, the semiconductor layer, the plurality of data lines and the plurality of gate lines are sequentially disposed on the lower surface of the first insulation substrate, where the plurality of transparent conductive layers and the plurality of gate lines collectively define a touch sensor unit, and where the plurality of transparent conductive layers are connected each other in parallel in the touch sensor unit.

In an exemplary embodiment, a capacitance may be generated between a transparent conductive layer of the plurality of transparent conductive layers and a gate line of the plurality of gate lines such that a touch sensor is collectively defined by the transparent conductive layer and the gate line.

In an exemplary embodiment, the transparent conductive layer may extend in a direction crossing the gate line.

In an exemplary embodiment, the gate line may extend in a transverse direction and include a gate electrode protruded from the gate line, and the transparent conductive layer may overlap the gate electrode.

In an exemplary embodiment, the transparent conductive layer may include a first region and a second region, the first region of the transparent conductive layer overlaps the gate electrode, and the second region of the transparent conductive layer is adjacent to the gate electrode and not overlapping the gate electrode.

In an exemplary embodiment, a width of the first region may be less than a width of the second region.

In an exemplary embodiment, the transparent conductive layer may surround at least a portion of the gate electrode in a top view.

In an exemplary embodiment, the display device may further include a common electrode disposed in a layer, in which the gate line is disposed, and the common electrode and the transparent conductive layer are overlapping each other.

In an exemplary embodiment, the display device may further include a polarizer disposed on the plurality of transparent conductive layers.

In an exemplary embodiment, a plurality of touch sensor units may be provided along a column direction.

In an exemplary embodiment, the touch sensor unit may include a connection connecting each end of the plurality of transparent conductive layers.

According to exemplary embodiments of the invention, in a panel structure, one transparent conductive layer for sensing is provided on the thin film transistor array panel, and the touch panel is realized using the capacitance along with the gate line of the thin film transistor. Accordingly, the touch panel structure is substantially simplified and the capacitance used for the sensing is substantially increased, such that the sensitivity of the touch panel is substantially improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF THE EMBODIMENTS

Figure 1:
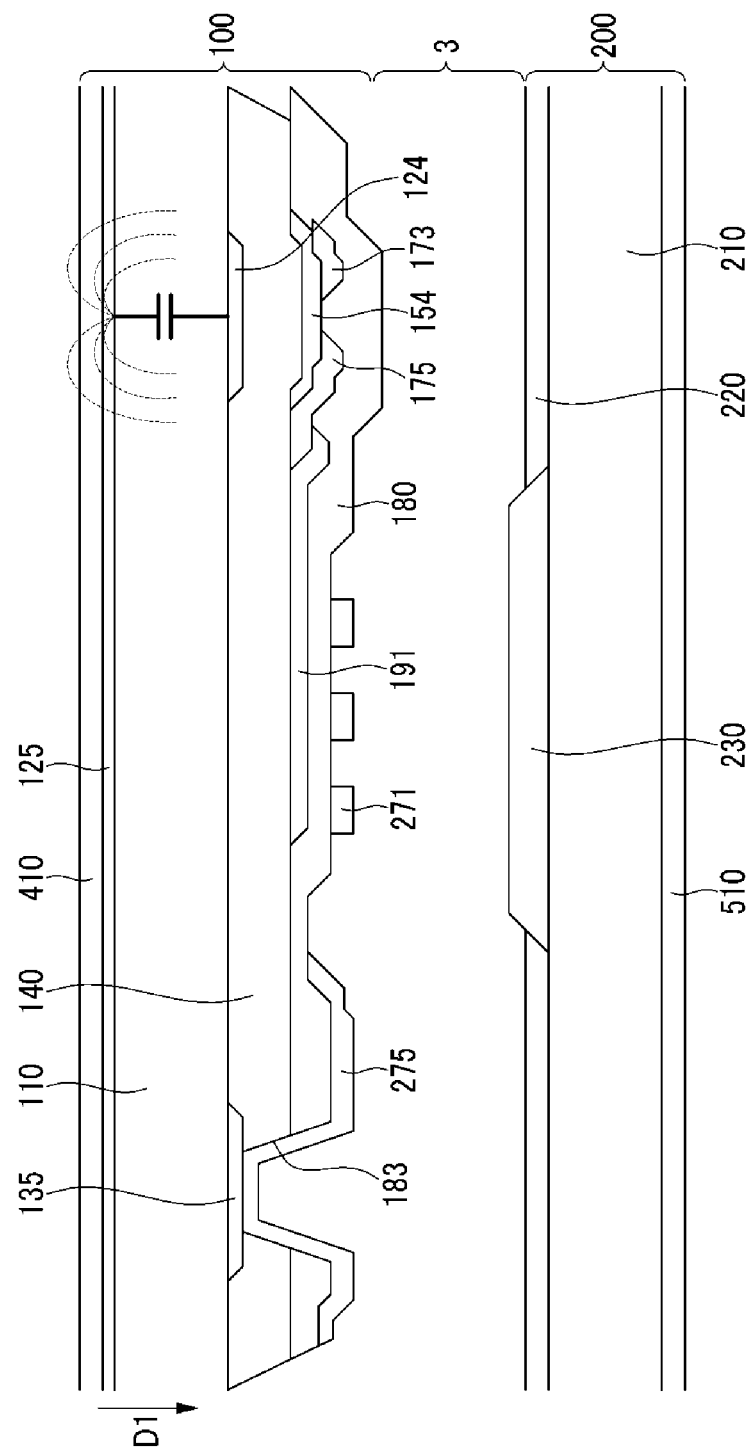
FIG. 1 is a cross-sectional view of an exemplary embodiment of a display device including a touch sensor according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

FIG. 1 is a cross-sectional view of an exemplary embodiment of a display device including a touch sensor according to the invention.

Referring to FIG. 1, an upper panel 100 including a thin film transistor and a lower panel 200 including a color filter 230 face each other, and a liquid crystal layer 3 is disposed between the upper panel 100 and the lower panel 200.

In such an embodiment, a display panel including the thin film transistor is disposed at the upper side.

Firstly, the upper panel 100 will be described.

The upper panel 100 includes a gate line on a first substrate 110 including transparent glass or plastic. The first substrate 110 has an upper surface and a lower surface. The gate line extending in a transverse direction and a gate electrode 124 protruded from the gate line are disposed on the lower surface of the first substrate 110. A reference voltage line (also referred to as "common electrode") including an expansion 135 for connection to reference electrodes 271 and 275 that transmits a predetermined reference voltage and disposed in a layer where the gate electrode 124 is disposed.

In an exemplary embodiment, the gate line may include a material such as an aluminum-based metal of aluminum (Al) or aluminum alloys, a silver-based metal of silver (Ag) or silver alloys, a copper-based metal of copper (Cu) or copper alloys, a molybdenum-based metal of molybdenum (Mo) or molybdenum alloys, chromium (Cr), tantalum (Ta), and titanium (Ti). In an exemplary embodiment, the gate line may have a multilayer structure including at least two conductive layers having different physical properties.

The reference voltage line may be parallel to the gate line and may include a material substantially the same as a material of the gate line.

A gate insulating layer 140, including silicon nitride (SiNx) or silicon oxide (SiOx), is provided on the gate electrode 124 and the expansion 135 of the reference voltage line. The gate insulating layer 140 may have a multilayer structure including at least two conductive layers having different physical properties.

A semiconductor layer 154 including amorphous silicon or polysilicon is provided on the gate insulating layer 140. The semiconductor layer 154 overlaps at least a portion of the gate electrode 124.

A source electrode 173 and a drain electrode 175 of the thin film transistor are disposed facing each other on the semiconductor layer 154. A data line electrically connected to the source electrode 173 and extending in a direction crossing the gate line is disposed on the gate insulating layer 140.

In an exemplary embodiment, the data line transmits the data signal and extends primarily in a longitudinal direction such that the data line intersects the gate line and the reference voltage line.

The gate electrode 124, the source electrode 173, and the drain electrode 175 collectively define the thin film transistor along with the semiconductor layer 154, and a channel of the thin film transistor is formed in the semiconductor layer 154 between the source electrode 173 and the drain electrode 175.

Ohmic contacts (not shown) may be provided between the semiconductor layer 154 and the source electrode 173 and between the semiconductor layer 154 and the drain electrode 175. The ohmic contacts may include a material such as n+ hydrogenated amorphous silicon, in which an n-type impurity, such as phosphorus, is doped at a high concentration, or silicide.

A pixel electrode 191 is disposed overlapping a portion of the drain electrode 175 on the gate insulating layer 140. The pixel electrode 191 covers a portion of the drain electrode 175 such that the pixel electrode 191 is physically and electrically connected to the drain electrode 175.

The pixel electrode 191 may include a transparent conductive material, such as indium tin oxide ("ITO") or indium zinc oxide ("IZO"), for example.

A passivation layer 180 is disposed on the source electrode 173, the drain electrode 175, the exposed semiconductor layer 154 and the pixel electrode 191. In an exemplary embodiment, the passivation layer 180 includes an inorganic insulator, such as silicon nitride and silicon oxide. In alternative exemplary embodiment, the passivation layer 180 may include an organic insulator and may have a flat or planar surface. In an exemplary embodiment, the organic insulator may have photosensitivity. In an exemplary embodiment, for example, the dielectric constant of the organic insulator is equal to or less than about 4.0. In an exemplary embodiment, the passivation layer 180 may have a dual-layered structure including a lower inorganic layer and an upper organic layer such that the lower inorganic layer may protect an exposed portion of the semiconductor 154 and the upper organic layer may insulate the layer disposed thereunder.

A contact hole 183 may be formed through the passivation layer 180 and the gate insulating layer 140, and expose the expansion 135 of the reference voltage line.

The reference electrodes 271 and 275 are provided on the passivation layer 180. The reference electrodes 271 and 275 overlap the pixel electrode 191, and include a plurality of branch electrodes 271 and a connection (not shown) that connects the plurality of branch electrodes 271. The reference electrodes 271 and 275 may include a transparent conductive material, such as ITO or IZO, for example. The reference electrodes 271 and 275 disposed in neighboring pixels are connected to each other.

Although not shown, in an exemplary embodiment, an alignment layer may be disposed covering the reference electrodes 271 and 275 and the passivation layer 180, and the alignment layer may be a horizontal alignment layer and may be rubbed in a predetermined direction.

In an exemplary embodiment, when a direction of the lower surface of the first substrate 110 that is toward the outside is referred to as the first direction D1, the gate line including the gate electrode 124, the gate insulating layer 140, the semiconductor layer 154, the source electrode 173 and the drain electrode 175 are sequentially deposited in the first direction D1.

In an exemplary embodiment, a transparent conductive layer 125 is disposed on the upper surface of the first substrate 110. The transparent conductive layer 125 may include a transparent conductive material, such as ITO or IZO, for example, and a method such as a sputtering or chemical vapor deposition may be used to provide the transparent conductive layer 125 on the upper surface of the first substrate.

The transparent conductive layer 125 may be provided in the direction crossing the direction in which the gate line extends, and may overlap the gate electrode 124.

The first substrate 110 is interposed between the transparent conductive layer 125 and the gate line, e.g., the gate electrode 124, and the transparent conductive layer 125 and the gate electrode 124 collectively define a capacitor. In an exemplary embodiment, the capacitor defined by the transparent conductive layer 125 and the gate electrode 124 functions as a touch sensor.

A polarizer 410 is disposed on the transparent conductive layer 125.

Now, the lower panel 200 will be described.

A light blocking member 220 is disposed on the second substrate 210 including transparent glass or plastic. The light blocking member 220 (also referred to as "black matrix") prevents light leakage.

A plurality of color filters 230 is disposed on the second substrate 210. A substantially portion of the color filters 230 are in a region surrounded by the light blocking member 220, and a length direction of the color filters 230 may extend along a column of the pixel electrodes 191. The color filters 230 may display one of three primary colors, e.g., red, green and blue.

In an exemplary embodiment, an overcoat (not shown) may be disposed on the color filter 230 and the light blocking member 220. The overcoat may include an (organic) insulator, and prevents the color filter 230 from being exposed and provides a flat or planar surface. In an alternative exemplary embodiment, the overcoat may be omitted.

In an exemplary embodiment, a polarizer 510 is disposed on a surface opposite to the surface of the second substrate 210 on which the light blocking member 220 is disposed. In an alternative exemplary embodiment, the polarizer 510 disposed on the lower surface of the second substrate 210 may be omitted.

The liquid crystal layer 3 is disposed between the upper panel 100 and the lower panel 200.

The pixel electrode 191 receives the data voltage from the drain electrode 175, and the reference electrodes 271 and 275 receive a reference voltage having a predetermined value from the expansion 135 of the reference voltage line. The reference voltage is applied from a reference voltage application unit (not shown) disposed outside the display area to prevent the voltage drop inside the display area, and the reference electrodes 271 and 275 are connected to each other such that the reference voltage of the predetermined value may be received from the reference voltage line 131.

The pixel electrode 191 applied with the data voltage generates an electric field along with the reference electrode 271 applied with the reference voltage such that the liquid crystal molecules of the liquid crystal layer 3 disposed between the two electrodes 191 and 271 are rotated. Polarization of light that transmits through the liquid crystal layer is changed based on the rotation direction of the liquid crystal molecules.

In an exemplary embodiment of the invention, the alignment layer is rubbed such that the liquid crystal molecules of the liquid crystal layer 3 are pretilted at a predetermined angle. The liquid crystal molecules may be quickly rotated in the pre-tilted direction.

In an exemplary embodiment, the pixel electrode 191 of the display device is disposed between the gate insulating layer 140 and the passivation layer 180 covering a portion of the drain electrode 175 to be electrically and physically connected to the drain electrode 175, and the aperture ratio substantially increases compared to a liquid crystal display in which a pixel electrode and a drain electrode are connected to each other through a contact hole 183.

In an exemplary embodiment, the color filter 230 and the light blocking member 220 are disposed in the lower panel 200. In an alternative exemplary embodiment, at least one of the color filter 230 or the light blocking member 220 may be disposed in the upper panel 100.

Next, an exemplary embodiment of a touch sensor according to the invention will be described with reference to FIGS. 2 to 4.

Figure 2:
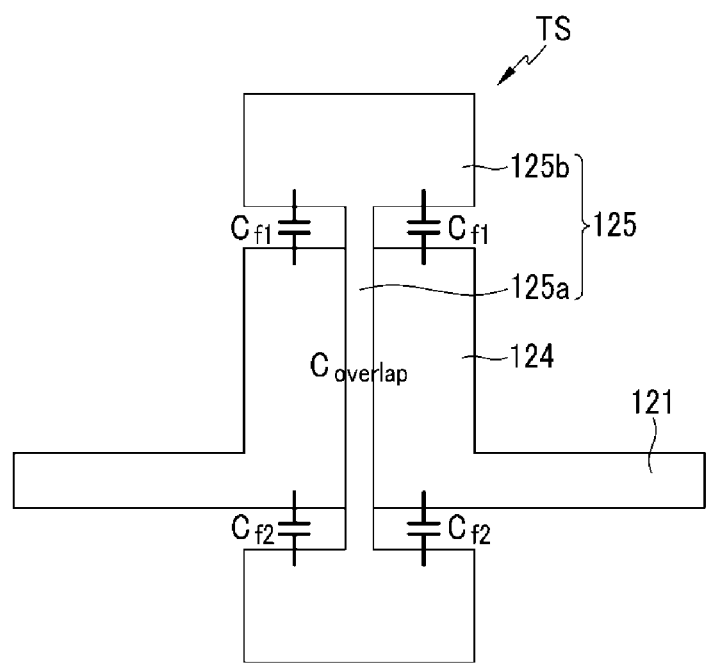
FIG. 2 is a top plan view of an exemplary embodiment of a touch sensor according to the invention.

FIG. 2 is a top plan view of an exemplary embodiment of a touch sensor according to the invention. FIG. 2 shows a structure of a gate electrode 124 and a transparent conductive layer 125 that collectively define the touch sensor in the exemplary embodiment of FIG. 1.

Referring to FIG. 2, a gate line 121 extends in the transverse direction, and the gate electrode 124 is protruded from the gate line 121. The transparent conductive layer 125 has a first region 125a and a second region 125b. The transparent conductive layer 125 is disposed along the direction crossing the gate line 121, the first region 125a is a portion where the transparent conductive layer 125 overlaps the gate electrode 124, and the second region 125b is a portion where the transparent conductive layer 125 is close to the gate electrode 124 while not overlapping the gate electrode 124.

Referring to FIGS. 1 and 2, the first substrate 110 is interposed between the gate line 121, including the gate electrode 124, and the transparent conductive layer 125. Accordingly, an overlap capacitance $C_{overlap}$ is generated between the gate electrode 124 and the first region 125a of the transparent conductive layer 125, and a fringe capacitance ($C_{f1}$ and $C_{f2}$) is generated between the gate electrode 124 and the second region 125b of the transparent conductive layer 125. In an exemplary embodiment, a width of the first region 125a of the transparent conductive layer 125 is may be less than a width of the second region 125b. When an external contact is applied to the touch sensor TS, the overlap capacitance $C_{overlap}$ is not changed and the fringe capacitance ($C_{f1}$ and $C_{f2}$) is substantially changed. In an exemplary embodiment, the overlap capacitance $C_{overlap}$ may be reduced with respect to the fringe capacitance ($C_{f1}$ and $C_{f2}$) through a width design such that the capacitance change between the gate electrode 124 and the transparent conductive layer 125 may be effectively sensed.

When the gate voltage is applied through the gate line 121 and the sensing voltage is applied through the transparent conductive layer 125, the capacitance between the gate electrode 124 and the transparent conductive layer 125 may be changed due to a touch thereon such that the touch position may be sensed by detecting the change of capacitance. In an exemplary embodiment, the transparent conductive layer 125 and the gate electrode 124 may form the touch sensor TS. In an exemplary embodiment, a measured value of the capacitance of one touch sensor TS is about 0.97 femtofarad (fF).

Figure 3:
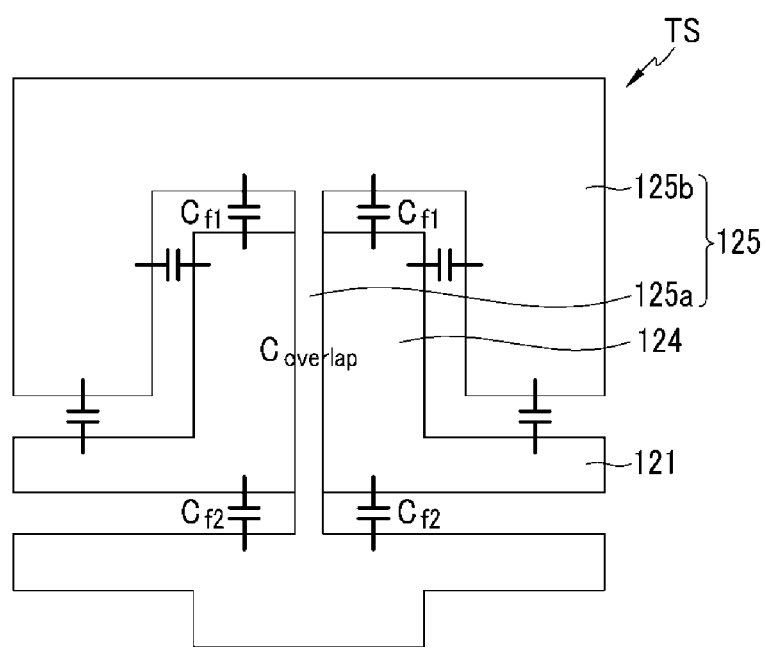
FIG. 3 is a top plan view of an alternative exemplary embodiment of a touch sensor according to the invention.

FIG. 3 is a top plan view of an alternative exemplary embodiment of a touch sensor according to the invention.

Referring to FIG. 3, similarly to the exemplary embodiment shown in FIG. 2, the gate line 121 extends in the transverse direction, and the gate electrode 124 is protruded from the gate line 121. The transparent conductive layer 125 has the first region 125a and the second region 125b.

In such an embodiment, the second region 125b of the transparent conductive layer 125 is extended compared to the exemplary embodiment of FIG. 2 and surrounds at least a portion of the side surface of the gate electrode 124 such that an area of the second region 125b of the exemplary embodiment in FIG. 3 is greater than an area of the second region 125b of the exemplary embodiment in FIG. 2.

In such an embodiment, the capacitance between the gate electrode 124 and the transparent conductive layer 125 forming the touch sensor TS is substantially increased such that the sensitivity of sensing the touch portion is substantially improved.

The measured value of the capacitance of one touch sensor TS in FIG. 3 is about 1.156 fF.

Figure 4:
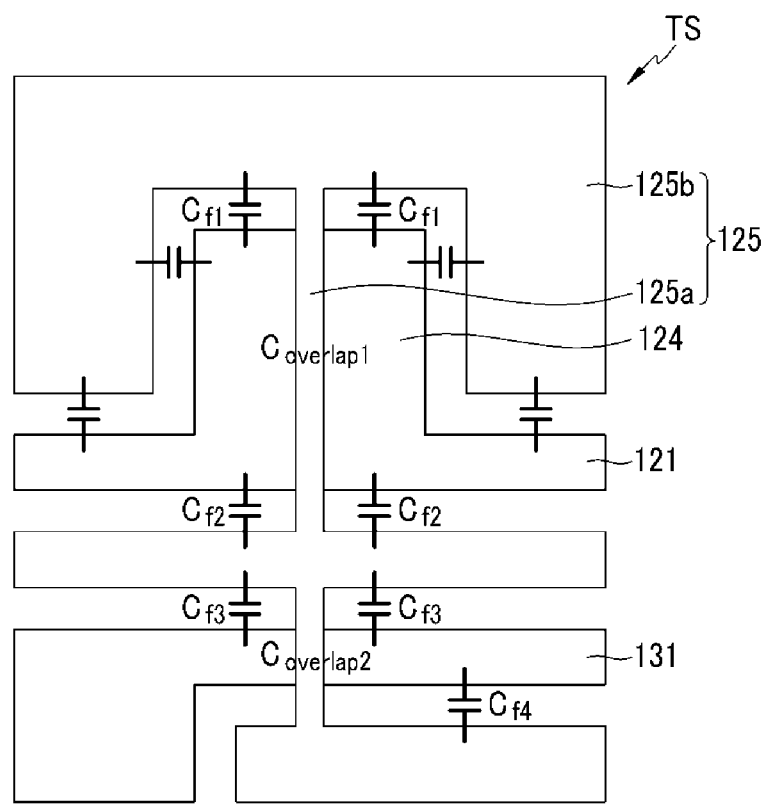
FIG. 4 is a top plan view of another alternative exemplary embodiment of a touch sensor according to the invention.

FIG. 4 is a top plan view of another alternative exemplary embodiment of a touch sensor according to the invention.

Referring to FIG. 4, the reference voltage line 131 is disposed neighboring the gate line 121. The transparent conductive layer 125 intersects the reference voltage line 131 as well as the gate line 121, and the overlap capacitance $C_{overlap2}$ and the fringe capacitance ($C_{f3}$ and $C_{f4}$) are additional generated between the second region 125b of the transparent conductive layer and the reference voltage line 131. In such an embodiment, the total capacitance of the touch sensor TS is substantially increased, and the sensitivity of sensing the touch position is substantially improved.

The measured value of the capacitance of one touch sensor TS in FIG. 4 is about 1.39 fF.

In an exemplary embodiment, the measured value of the capacitance of a touch sensor TS is in a range from about 0.97 fF to about 1.39 fF. In an exemplary embodiment, the capacitance value of the touch portion may be further increased.

Hereinafter, an exemplary embodiment of a plurality of touch sensor units which effectively senses the touch position will be described.

Figure 5:
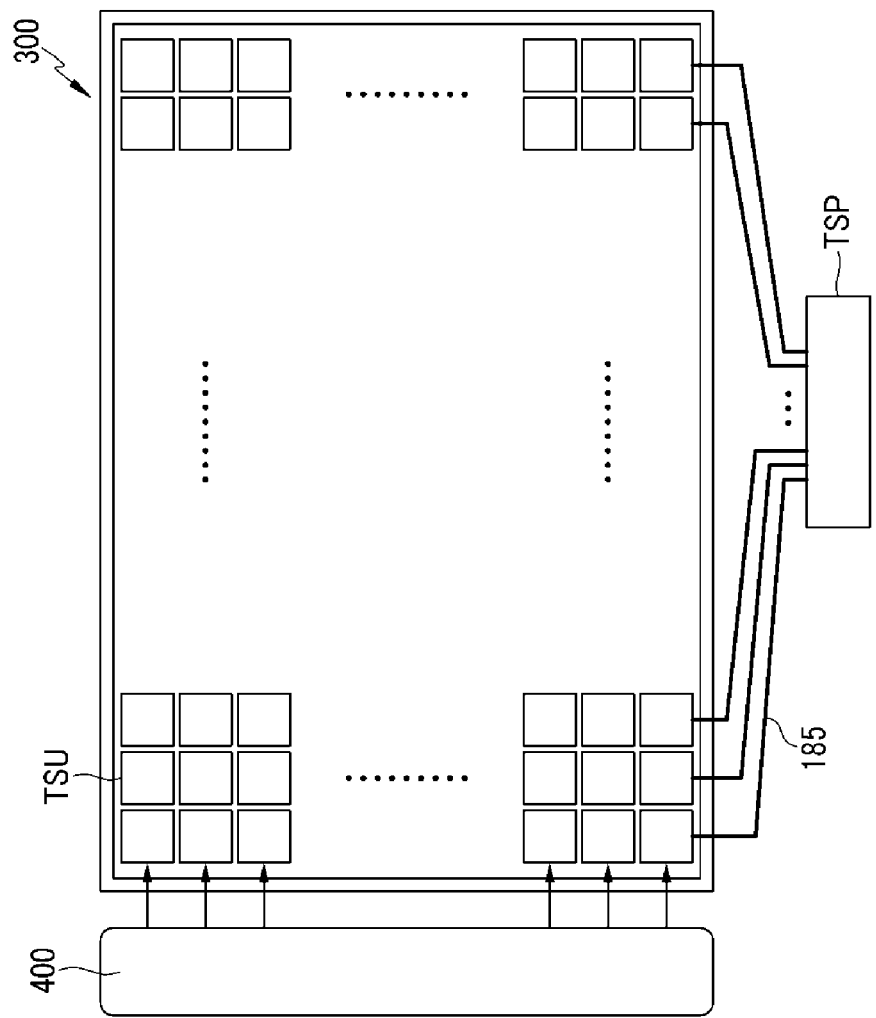
FIG. 5 is a layout view of an exemplary embodiment of a plurality of touch sensor units according to the invention.
Figure 6:
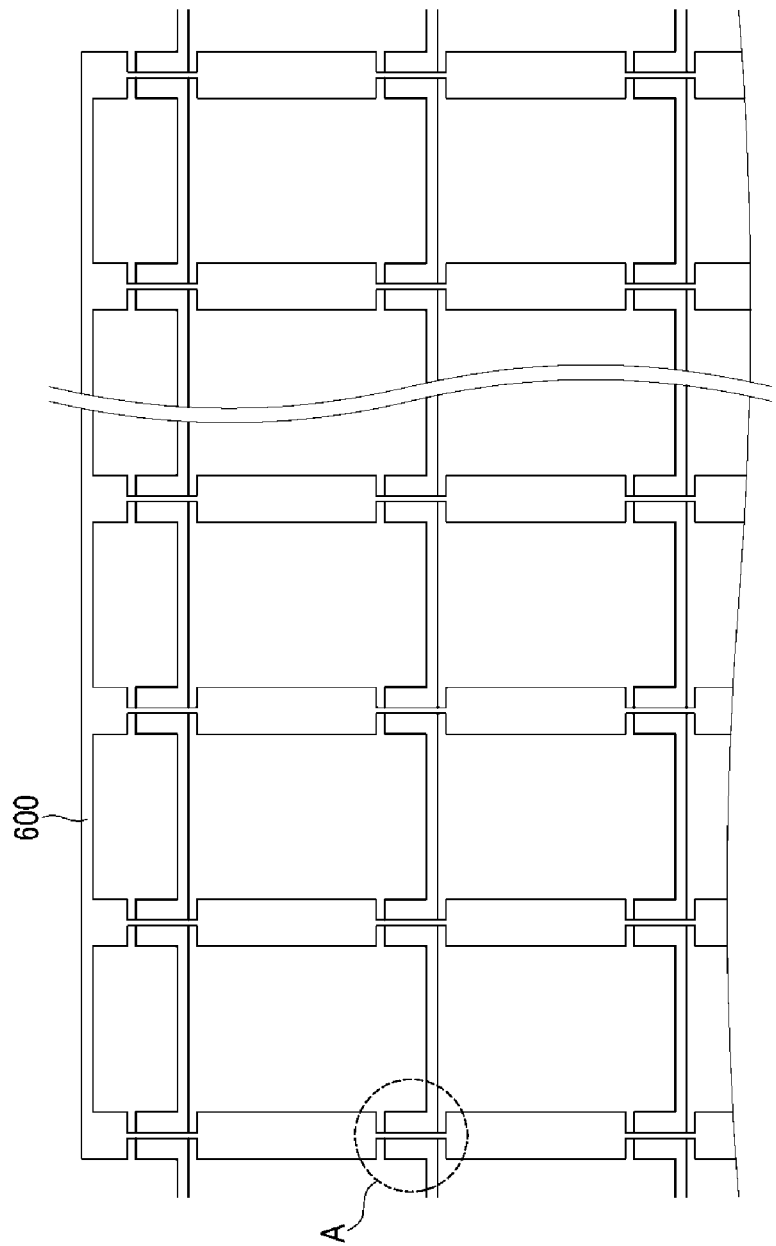
FIGS. 6 to 8 are top views of one of a plurality of touch sensor units of FIG. 5.
Figure 7:
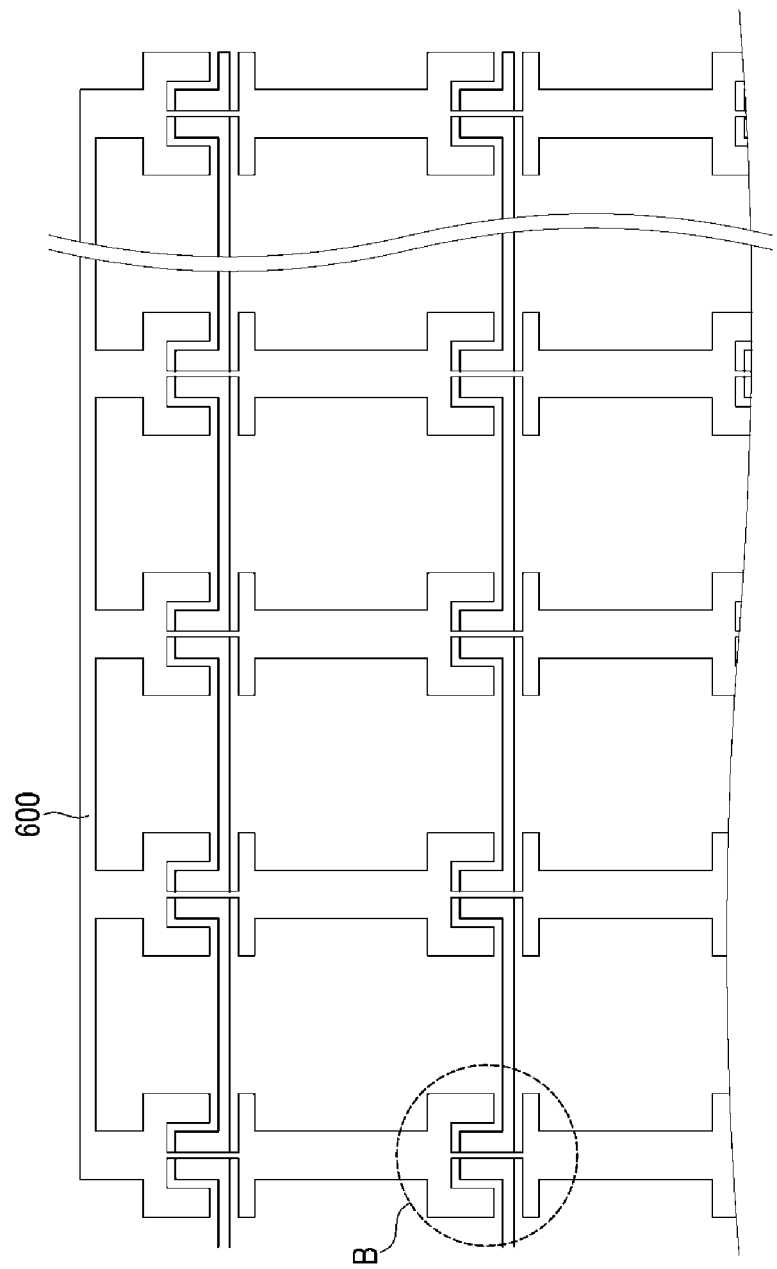
Figure 8:
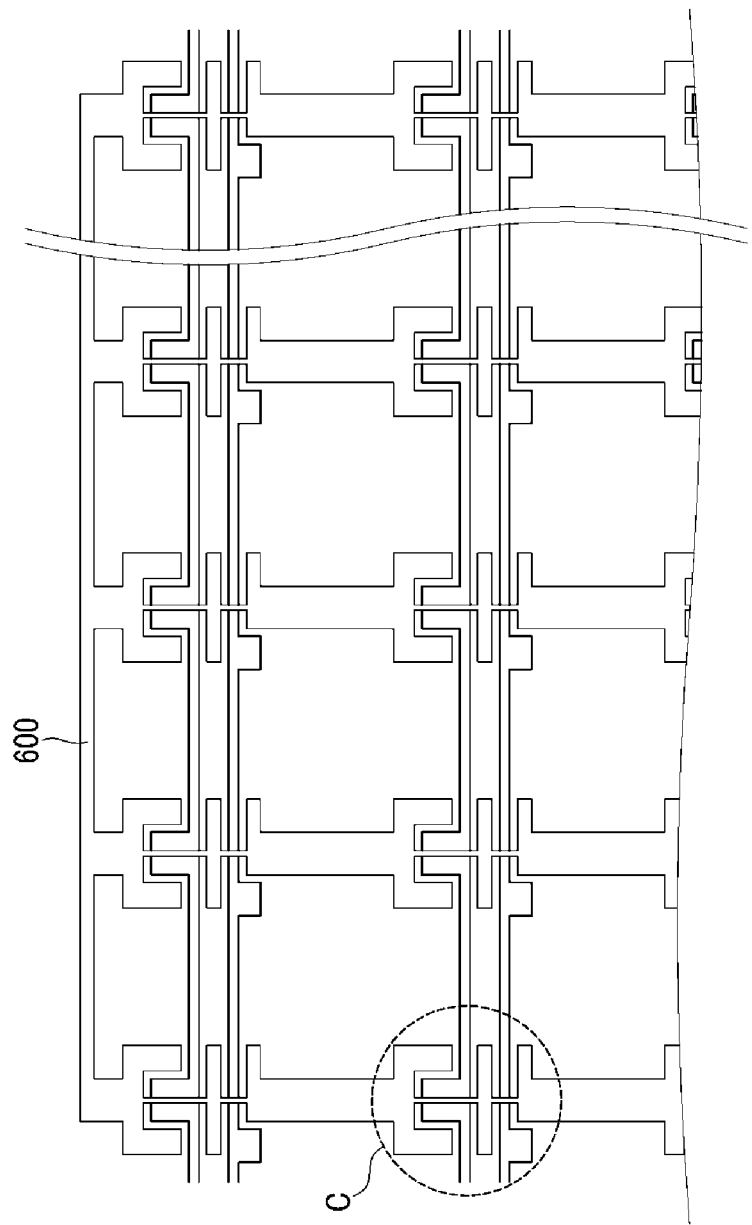

FIG. 5 is a top plan view of an exemplary embodiment of a plurality of touch sensor units according to the invention. FIGS. 6 to 8 are top plan views of alternative exemplary embodiments of a plurality of touch sensor units.

Referring to FIGS. 5 and 6, a plurality of touch sensor units TSU are arranged substantially in a matrix form on the display panel 300. The gate signal generated in a gate driver 400 is applied to a touch sensor unit TSU of the touch sensor units TSU, and the gate signal is transmitted through the gate line 121 in the touch sensor unit TSU.

In the touch sensor unit TSU, a plurality of gate lines 121 extend in the transverse direction and a plurality of transparent conductive layers 125 extend in the direction crossing the gate line 121. A plurality of transparent conductive layers 125 of the touch sensor unit TSU are connected to the touch signal controller TSP through connection wiring 185. The touch signal controller TSP measures the degree of change of the capacitance between the gate electrode 124 and the transparent conductive layer 125, which is measured to detect an occurrence of a touch and the position of the touch.

Referring to FIGS. 1 and 6, in an exemplary embodiment of the touch sensor unit TSU, a plurality of touch sensors TS are connected to each other and each end of a plurality of transparent conductive layers 125 is connected by a connection 600. In an exemplary embodiment, as shown in FIG. 6, the upper end of the transparent conductive layer 125 is connected by the connection 600. In an alternative exemplary embodiment, the lower end of the transparent conductive layer 125 may be connected by another connection (not shown).

In an exemplary embodiment, a plurality of transparent conductive layers 125 arranged in the column direction may be connected to each other in parallel by the connection 600.

In the illustrated exemplary embodiment of FIG. 6, the touch sensor unit TSU includes a plurality of touch sensor TS connected to each other such that the touch sensor unit TSU may have a capacitance of about 1.8 picofarad (pF).

In the illustrated exemplary embodiment of FIG. 6, each of the plurality of touch sensors TS is substantially the same as the touch sensor shown in FIG. 2. In FIG. 6, a portion indicated as "A" may correspond to the exemplary embodiment of the touch sensor TS shown in FIG. 2.

The touch sensor unit shown in FIG. 7 is substantially the same as of the touch sensor unit shown in FIG. 6 except the structure and connection of the touch sensors therein. In FIG. 7, a portion indicated by "B" may correspond to the exemplary embodiment of the touch sensor TS shown in FIG. 3.

The touch sensor unit TSU of FIG. 7 includes a plurality of touch sensors TS connected to each other such that the touch sensor unit TSU may have a capacitance of about 1.95 pF.

The touch sensor unit shown in FIG. 8 is substantially the same as of the touch sensor unit shown in FIG. 6 except the structure and connection of the touch sensors therein. In FIG. 8, a portion indicated by "C" may correspond to the exemplary embodiment of the touch sensor TS shown in FIG. 4.

The touch sensor unit TSU of FIG. 8 includes a plurality of touch sensors TS connected to each other such that the touch sensor unit TSU may have a capacitance of about 2.25 pF.

In the exemplary embodiments as described herein, the display device includes the liquid crystal display having the panel of a plane-to-line-switching ("PLA") type. However, the characteristics of the invention detect the change of the capacitance generated between the gate electrode 124 and the transparent conductive layer 125 via the first substrate 110 interposed therebetween to sense the touch position such that the structure of the panel is not limited to the PLA type. In an alternative exemplary embodiment, the display device may have a panel of different types, such as a vertical alignment ("VA") type, a twisted nematic ("TN") type, or an in-plane switching ("IPS") type, for example.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a first insulation substrate having an upper surface and a lower surface;
a transparent conductive layer disposed on the upper surface of the first insulation substrate;
a gate line disposed on the lower surface of the first insulation substrate, and including a gate electrode protruded from the gate line;
a gate insulating layer disposed on the gate line;
a semiconductor layer disposed on the gate insulating layer;
a data line disposed on the semiconductor layer and connected to a source electrode and a drain electrode facing the source electrode; and
a pixel electrode electrically connected to the drain electrode,
wherein
the gate line, the gate insulating layer, the semiconductor layer and the data line are sequentially disposed on the lower surface of the first insulation substrate,
the transparent conductive layer includes a first region and a second region,
the first region of the transparent conductive layer overlaps the gate electrode, and the second region of the transparent conductive layer is adjacent to the gate electrode and not overlapping the gate electrode.

2. The display device of claim 1, wherein a capacitance is generated between the transparent conductive layer and the gate line such that a touch sensor is collectively defined by the transparent conductive layer and the gate line.

3. The display device of claim 2, wherein the transparent conductive layer extends in a direction crossing the gate line.

4. The display device of claim 3, wherein the gate line extends in a transverse direction.

5. The display device of claim 1, wherein a width of the first region is less than a width of the second region.

6. The display device of claim 5, wherein the second region of the transparent conductive layer surrounds at least a portion of the gate electrode in a top plan view.

7. The display device of claim 6, further comprising: a common electrode disposed in a layer, in which the gate line is disposed, wherein the common electrode and the transparent conductive layer are overlapping each other.

8. The display device of claim 1, further comprising: a polarizer disposed on the transparent conductive layer.

9. The display device of claim 1, further comprising: a second insulation substrate disposed opposite to the first insulation substrate; and a liquid crystal layer disposed between the first insulation substrate and the second insulation substrate.

10. A display device comprising:
a first insulation substrate having an upper surface and a lower surface;
a plurality of transparent conductive layers disposed on the upper surface of the first insulation substrate;
a plurality of gate lines disposed on the lower surface of the first insulation substrate, and including a plurality of gate electrodes protruded from the plurality of gate lines;
a gate insulating layer disposed on the plurality of gate lines;
a semiconductor layer disposed on the gate insulating layer; and
a plurality of data lines disposed on the semiconductor layer,
wherein the gate insulating layer, the semiconductor layer, the plurality of data lines and the plurality of gate lines are sequentially disposed on the lower surface of the first insulation substrate,
wherein the plurality of transparent conductive layers and the plurality of gate lines collectively define a touch sensor unit, and
wherein
the plurality of transparent conductive layers are connected to each other in parallel in the touch sensor unit,
the plurality of transparent conductive layers each include a first region and a second region,
the first region overlaps a corresponding gate electrode of the plurality of gate electrodes, and
the second region is adjacent to the corresponding gate electrode and not overlapping the corresponding gate electrode.

11. The display device of claim 10, wherein the touch sensor unit comprises a plurality of touch sensors, and a capacitance is generated between a transparent conductive layer of the plurality of transparent conductive layers and a gate line of the plurality of gate lines such that the transparent conductive layer and the gate line collectively defines a touch sensor of the plurality of touch sensors.

12. The display device of claim 11, wherein the transparent conductive layer extends in a direction crossing the gate line.

13. The display device of claim 12, wherein the gate line extends in a transverse direction.

14. The display device of claim 11, wherein a width of the first region is less than a width of the second region.

15. The display device of claim 14, wherein the second region of the transparent conductive layer surrounds at least a portion of the gate electrode in a top view.

16. The display device of claim 15, further comprising: a common electrode disposed in a layer, in which the gate line is disposed, wherein the common electrode is crossing the transparent conductive layer.

17. The display device of claim 10, further comprising: a polarizer disposed on the plurality of transparent conductive layers.

18. The display device of claim 10, wherein a plurality of touch sensor units is provided along a column direction.

19. The display device of claim 11, wherein the touch sensor unit comprises a connection connected to an end of each of the plurality of transparent conductive layers.

* * * * *